United States Patent
Fenger

(10) Patent No.: US 8,998,546 B2
(45) Date of Patent: Apr. 7, 2015

(54) FIXTURE FOR RETAINING AN END OF A MEMBER

(75) Inventor: Per E Fenger, Terndrup (DK)

(73) Assignee: Liftra ApS, Aalborg (DK)

( * ) Notice: Subject to any disclaimer, the term of this patent is extended or adjusted under 35 U.S.C. 154(b) by 758 days.

(21) Appl. No.: 13/056,548

(22) PCT Filed: Jul. 23, 2009

(86) PCT No.: PCT/DK2009/050187
§ 371 (c)(1),
(2), (4) Date: Jan. 28, 2011

(87) PCT Pub. No.: WO2010/012280
PCT Pub. Date: Feb. 4, 2010

(65) Prior Publication Data
US 2011/0194896 A1    Aug. 11, 2011

(30) Foreign Application Priority Data
Jul. 30, 2008    (DK) .................................. 2008 01054

(51) Int. Cl.
*B60P 7/12* (2006.01)
*F03D 1/00* (2006.01)
*F03D 11/00* (2006.01)

(52) U.S. Cl.
CPC ................ *F03D 1/005* (2013.01); *F03D 11/00* (2013.01); *Y02E 10/722* (2013.01)

(58) Field of Classification Search
CPC ..................................................... F03D 1/005
USPC ................. 403/12; 248/229.1, 229.2, 229.21, 248/226.11, 228.6, 230.6, 512, 544; 108/57.13, 57.16; 410/33, 42, 44, 45, 410/47; 269/291, 130, 131
See application file for complete search history.

(56) References Cited

U.S. PATENT DOCUMENTS

| 4,660,796 A * | 4/1987 | Garrec .......................... 248/544 |
| 6,298,536 B1 * | 10/2001 | Rossway et al. ............. 29/281.1 |
| 7,210,882 B2 * | 5/2007 | Andersen et al. ............... 410/82 |
| 7,594,785 B2 * | 9/2009 | Wobben ......................... 410/53 |
| 8,186,916 B2 * | 5/2012 | Wessel et al. .................... 410/44 |
| 2003/0175089 A1 * | 9/2003 | Almind ............................. 410/2 |
| 2004/0091346 A1 * | 5/2004 | Wobben ........................ 414/563 |
| 2010/0266420 A1 * | 10/2010 | Rasmussen et al. ...... 416/244 R |
| 2011/0255934 A1 * | 10/2011 | Delgado Matarranz et al. ............................... 410/55 |
| 2012/0124833 A1 * | 5/2012 | Arendt et al. ................ 29/889.7 |
| 2013/0104376 A1 * | 5/2013 | Pedersen .................... 29/525.02 |

FOREIGN PATENT DOCUMENTS

| WO | 2004/101313 A1 | 11/2004 |
| WO | 2007/093854 A2 | 8/2007 |

* cited by examiner

*Primary Examiner* — Daniel P Stodola
*Assistant Examiner* — Matthew R McMahon
(74) *Attorney, Agent, or Firm* — Roberts Mlotkowski Safran & Cole, P.C.; David S. Safran

(57) ABSTRACT

A fixture for attachment of an end of a member, such as a wind turbine tower section, blade or hub for a wind turbine characteristically has an end flange. To enable clamping while being able to compensate for different hole patterns in the flanges, by the invention, the fixture provides for retaining of ends of members with flanges, regardless of flange diameter and hole patterns, and which is also quickly and easily installed. Additionally, it is possible to firmly clamp the flange end to upstanding frame parts of the fixture with fastening elements, thereby providing a stable connection between a console of the fixture and the upstanding frame parts.

8 Claims, 14 Drawing Sheets

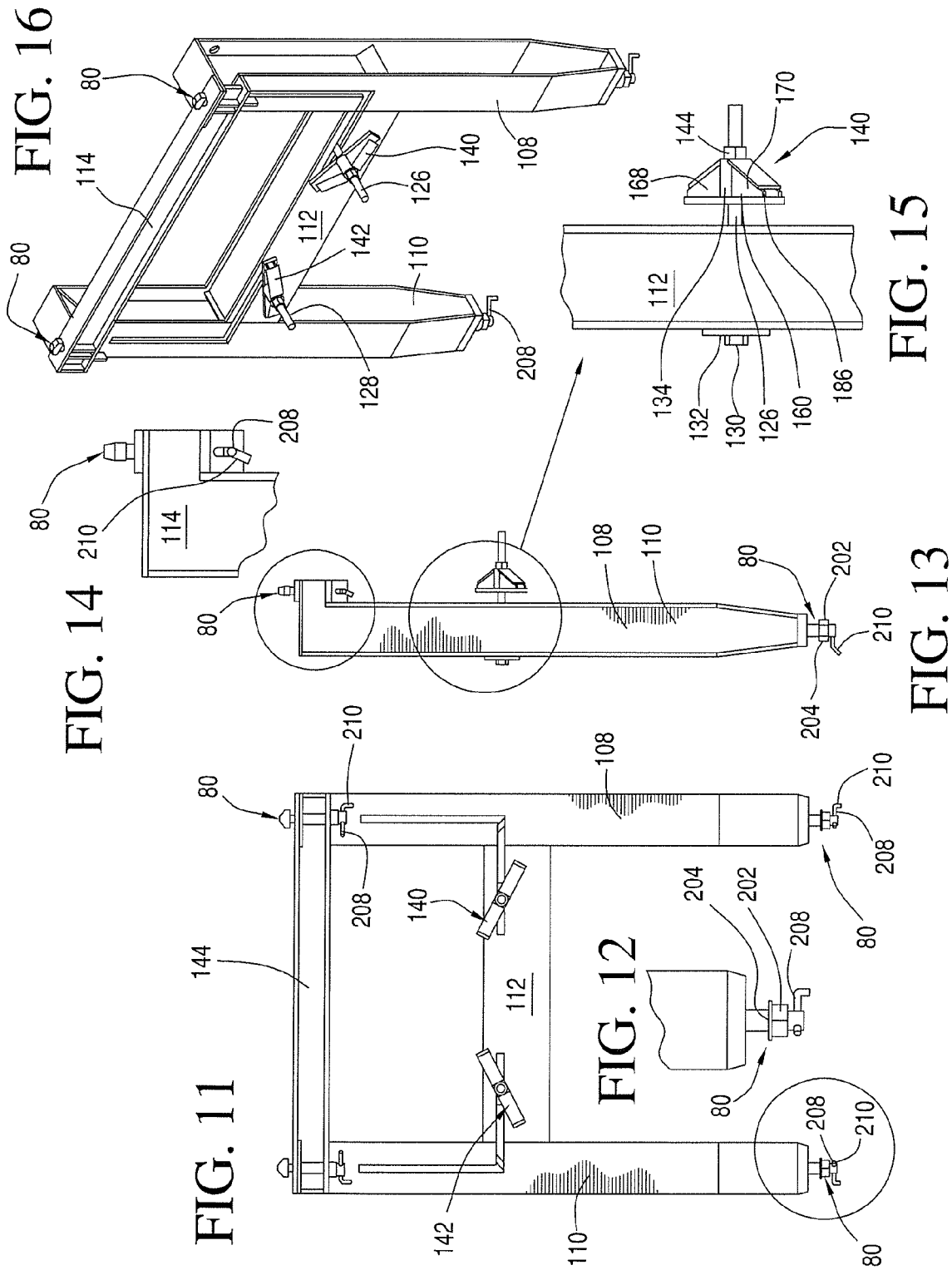

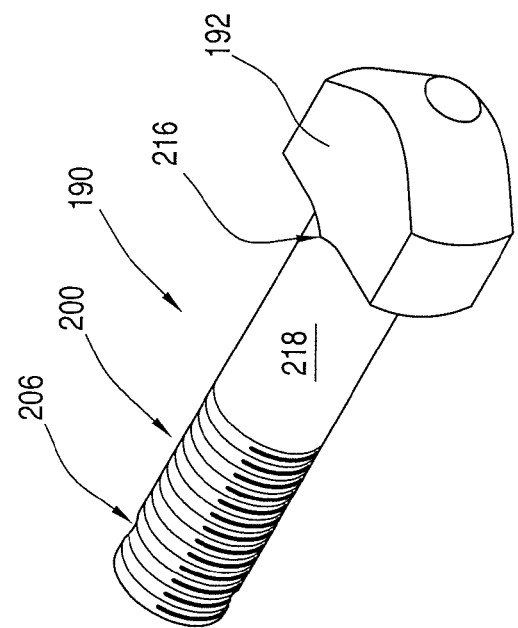
FIG. 20
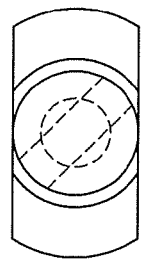
FIG. 23
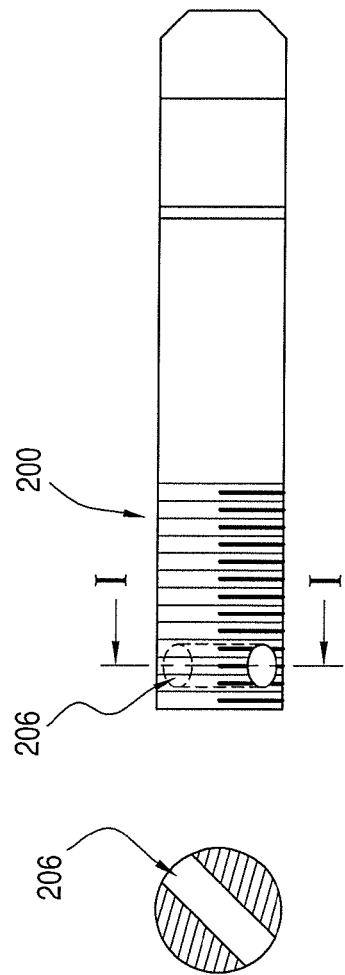
FIG. 22
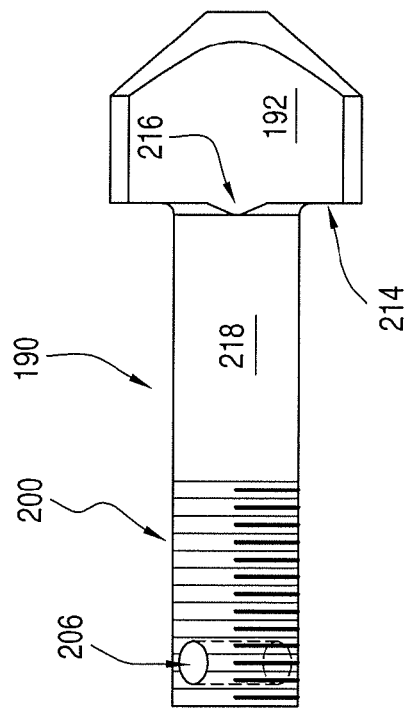
FIG. 21
FIG. 24

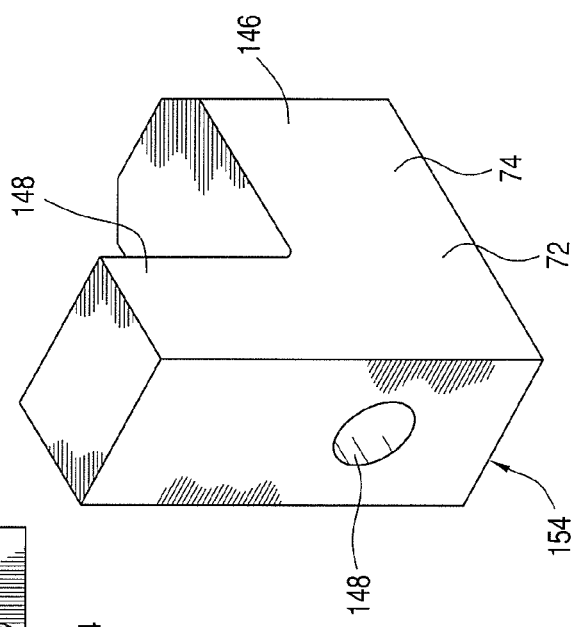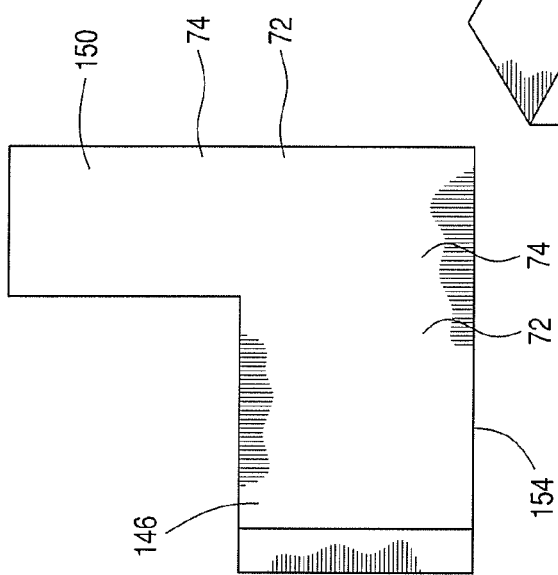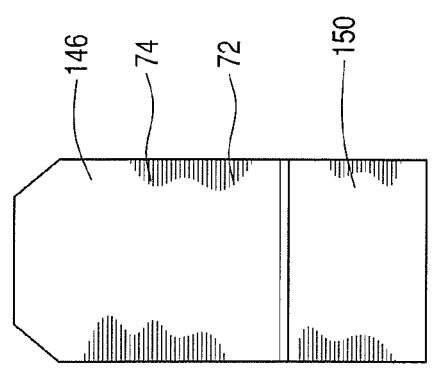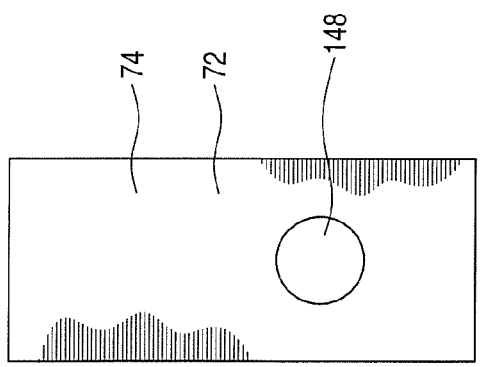

FIXTURE FOR RETAINING AN END OF A MEMBER

BACKGROUND OF THE INVENTION

1. Field of the Invention

The present invention relates to a fixture for retaining an end of a member, such as a section of a windmill tower, a blade for a windmill, or a hub for a wind mill turbine, the fixture comprising an axial control/retaining means in relation to the longitudinal axis of the member in form of a first lower console for preventing of a relative horizontal displacement between the end of the member and the fixture in a direction perpendicular to the end of the member in use, the console further including cross-positioning means for positioning the end of the member in relation to the fixture during fastening of the fixture to the end of the member in relation to a horizontal oriented direction parallel to the end of the member in use, and cross-axial holding means for preventing of a relative displacement between the end of the member and the fixture in a direction across of the longitudinal axis of the member, first connection devices for attachment of the fixture to an external structure different from the end of the member, and parts cooperating with at least two second connection devices for releaseable attachment of mainly vertically oriented frame parts upstanding from the fixture.

2. Description of Related Art

Members, in particular wind turbine tower sections, are typically cylindrical and slightly conical, and the ends have an internal flange with a plurality of holes, mainly for use in connecting of the sections of the wind mill on site. However, the ends might also have flanges on the outside for assembling of the sections, but outside flanges are primarily used in connection of wind mill towers to a foundation. The tower sections typically have an outside diameter between 2 to 5 meters, a weight of 10 to 80 tons, and a length of approximately 10 meters, and in certain circumstances, even larger dimensions than the above indicated are used. Retaining and handling such sections during transport is thus far from a routine task. In most cases, the relocation of a wind mill tower from the production site to the operation site includes more than one category of transportation. The transport will typically consist of two or more transports on sea, railway and road, and thus, reloading of the tower sections is not an insignificant task to perform due to the size and weight of the sections.

Such a fixture is, among others, known from International Patent Application Publication WO 2007/093854 (Vestas A/S) where the control/retaining means comprises displaceable and pivotally mounted locking elements, with through openings for admission of bolts which are passed through flanges in an adjacent end of the member to be secured. The locking elements are naturally manufactured of high performance steel, and the locking elements are thus relative heavy and difficult to handle for the workers who are intended to secure the end of the member to the control/retaining means. The displaceable and pivotable mounting of the locking elements in the control/retaining means results in that the holes in them can be positioned with a hole in a flange in the end of a member which is to be secured, however within the flange dimensions and hole patterns in flanges to which the control/retaining means is designed. The known fixture has thus a certain, but still limited flexibility in use, understood in that way, that the limits for displacement and pivoting of the locking elements sets the limits for which diameters and hole patterns the fixture the fixture is useable for. Further, the work with the correct positioning of the holes in the locking elements might be considerably time consuming.

The fixture also has a frame part that is upstanding from the control/retaining means and comprising three parallel columns interrelated by three transversal beams, where the middle column comprises a through going track in which is put through and secured a locking device comprising a threaded rod with adjustable nuts for securing/clamping on each side of the middle column, and which, opposite the flange in the end of the member facing side, comprises a plate shaped body with elongated fit holes, for receiving of bolts for clamping in the flange in the end of the member. Due to the fact that the sections in wind turbine towers most frequently have a conical shape, there will naturally occur a certain space between the plate shaped body which is clamped in the flange in the end of the member and the mounting of threaded rod in the middle column. Under heavy cross oriented force impacts on the member, this leads to a very hard load on the threaded rod, which demands for large strength requirements to as well the middle column, as to the threaded rod and its anchoring in the column, which results in that it will be relatively costly.

SUMMARY OF THE INVENTION

It is the object of the present invention to provide a fixture of the specified type which is useable for transport of members of the specified type, in practically any size and with any hole pattern, and which further allows for a more swift arrangement of the member in it. It is further the object of the invention to provide a fixture where the upper locking device can be arranged in a simpler and thus cheaper manner compared to the above known fixture.

It is further the object of the invention to define a twist lock, which provides for a stable connection between the two further connection devices of the first lower console, and there from upstanding mainly vertical oriented frame parts.

With the invention, the objects are achieved with a fixture of the type described initially above, in that the console comprises a through-slit-opening located between the cross positioning means for introducing of a displaceable first holding device in the form of a bolt or a threaded rod with nut, the free end of the bolt or threaded rod is provided with a nut for clamping a displaceable first holding means on the bolt or threaded nut, for the engagement of the avert facing side related to the current console, of a flange of the end of the member, for counteracting of relative displacements between the console and the member parallel with the length axis of the member, and at least two pivotally mounted, threaded rods or bolts, the free ends of which comprises nuts for clamping displaceable mounted, second holding means on said rods, for engagement of the against the length axis oriented side of said flange, for counteracting of a relative horizontally directed displacement between the member and the fixture in a transverse direction relative to the length axis of the member, during use.

Hereby, the fixture according to the invention achieves a very high degree of flexibility as compared with the fixture disclosed in International Patent Application Publication WO 2007/093854, where the holes in the locking elements are to be positioned pivoting the locking elements in the holding means, since the attachment between the fixture/console can take place without respect to the hole pattern in a relevant flange in the end of a relevant member, since the first holding device is brought in touch with the facing side related to the console in the relevant end of the member, after which the first holding device, by the nut on the threaded rod or bolt is clamped in a manner that the flange is brought in firm touch with the console.

Subsequently, the second holding devices are easily brought into position against the side of the flange facing the length axis of the member, without taking any account to the hole pattern of the flange, thanks to the pivotable mountings of the threaded rods in the console, and being clamped by the nuts on the pivotally mounted threaded rods, after which, the member is secured by the first holding device against relative displacements between the console and the member in the length direction of the member, and by the second holding devices against relative displacements between the console and the member in the transverse direction.

In the context, it must be remembered that this is very large and heavy items, which are difficult to handle and bring in position, even if there is sufficient lifting capacity available, therefore will the fact that the attachment between the fixture and the item can take place without respect to the relevant hole pattern in flanges in the end of relevant members be crucial importance for how much time is needed for placing a topic member in the fixture.

It is noted that the fixture is useable regardless of whether the members have internal or external flanges, since the through-slit-shaped opening between the transverse positioning means has an extent to a level below the flanges, whereby it will be possible to perform a clamping of the holding means against the external flange. However, this might sometimes lead to a need for another design of the holding device than the one used for securing of ends of members with internal flanges.

With the object, further, to be able to prevent relative displacement between the fixture and the end the member, and also to be able to secure an additional member above the first, the fixture can additionally comprise a second upstanding frame part extending from the second connection devices, comprising two parallel, and by at least one but preferably two transverse beams, mutual connected columns, the length of which columns at least corresponds with the diameter of the member, said columns each including aligned parallel through-slit-openings on the side adjacent to the end of the member, in said slit-openings is mounted at least one displaceable threaded rod/bolt, the first end of which includes a head the diameter of which is larger than the width of the slit-shaped openings, during use of the fixture, the head touching the facing side of the columns, and in which the other threaded end comprises at nut cooperating with the threaded rod/bolt for clamping on said rods displaceable mounted third holding means for engagement of a flange on the end of a member on the oppositely facing side relative to the second frame part, for counteracting of a relative horizontal oriented displacement between the member and the fixture in a direction across the length axis of the member.

Thanks to the slit-openings, it will be easy and swift to arrange the third holding means in engagement with the flange by displacing the bolt or the threaded rod in the slit-openings, and subsequent tighten the holding means to the flange so that the end of the member is clamped firm attachment.

Using the fixture in connection with transport of members in the form of wind mill tower sections which are tapered, which means that the diameter of the first end is different from the diameter of the opposite end, might sometimes require the need of relatively large compensating abilities in connection with the positioning of the third holding means, so that these can be brought in engagement with a flange in the end of the member.

With the object of being able to use the fixture for all diameters of mill towers, the cross strut might comprise aligned, parallel through-slit-openings on the side adjacent to the member, and the relative to the member opposite facing side, oriented transverse and associated with the slit-openings in the columns, in said slit-openings is mounted at least one displaceable threaded rod/bolt, the first end of which includes a head the diameter of which is larger than the width of the slit-shaped openings, said head during use of the fixture is in touch with the avert facing side of the columns relative to the member, and the other threaded end of said threaded rod or bolt comprises a nut cooperating with the threaded rod/bolt for clamping on said rods displaceable mounted third holding means for engagement of a flange on the end of a member, for counteracting of a relative horizontal oriented displacement between the member and the fixture in a direction across the length axis of the member.

It will hereby be possible to use the fixture together with practically any known diameter on a member, for example, a mill tower.

With the intent to enable swift placement and attachment of the second retaining means, the second retaining means for engagement of a flange on the end of a member might be formed of claws, preferably of angular blocks, the first leg of which comprises a through-hole for receiving of the threaded rod/bolt so that the angular block is displaceable mounted on the threaded rod/bolt, and the second leg of the angular block is protruding perpendicularly from the first leg which during use is brought in attachment to the against the length axis of the member facing side of a flange in the end of the member, and clamped to firm attachment by a nut in the end of the threaded rod/bolt.

Thus, it will be relatively easy to arrange the other holding means in attachment with said side of the flange in the end of the member, and then stabilize the member against cross force effects on the length axis of the member, by tightening the nut.

Naturally, there will be very large force impacts tightening/clamping the second holding devices, and during use of these during transport of the members, where even very large dynamic force impacts may occur. These conditions might sometimes result in that the bolts, on which the second holding means are arranged, do not retain their directional stability, and possible will tend to bend out which, on some occasions, may result in that the engagement between the second holding means and the flange in the end of the member does not retain the presupposed strength properties due to an oblique pull in the second holding means arising by the deflection of the bolt/the threaded rod.

With the intention to counteract an oblique pull in the second holding means, the angular blocks may comprise a plain surface on its side facing opposite to the flange which, in use, is in touch with a support plate or prop emerging from the basis of the console.

It is hereby secured that the pull in the second holding means is directed to be perpendicular to the surfaces on the holding means adjacent to the sides of the flange.

To provide a stable and good support between the flange in the end of the member and the first and the third holding means, the first and third holding means may be formed of a wing comprising a plane, elongated pressure plate with a first surface for the engagement of a flange in the end of the member, and a second surface comprising a bushing for receiving a bolt or a threaded rod upstanding from the middle of the surface, and from said bushing extends equally formed, wedge shaped, plate shaped lugs/props from the second surface, the height of which over the second surface is lowest in the end facing opposite the bushing, which is ended at the edge of the pressure plate, and the edges opposite the second side surface of said lugs/props being connected with a plate extending from the bushing in direction of the end of the lugs/props.

By this design of the first and the third holding means, a suitable surface between the flange and the first surfaces of the holding means is achieved, since the contact area between the flange and the holding means increases as the distance to the bushing increases, due to the flange curvature. By the props, it is secured that the pull forces are transferred efficiently to the bolt or the threaded rod during use. Simultaneously, an easy and uncomplicated possibility for placement of the first and third holding means is again provided, when connecting of a member to the fixture, since the wings are easily displaced to their securing position and are turned in the correct position behind a relevant surface on a flange in the end of a member to be secured to the fixture for transport or handling.

To secure a stable attachment, in use, between the upstanding frame part and the end of the member, the upstanding second frame part from the second connection devices, in use, can be oblique relative to vertical, and can be clamped for firm attachment to the end of the member by third holding devices.

Clamping the frame part to obtain firm attachment of the end of the member by the third holding devices, in use, a minor torque load on the bolts/threaded rods is achieved, compared to the use of the stated known fixture, where there is a space between the frame and the end of the member. By the firm clamping attachment, there is further achieved a friction force between the end of the member and the fixture, which contributes to a further stabilization and securing of the member arranged in the fixture according to the invention.

With respect to space, sections of turbine towers are transported in equal lengths, so that two sections are positioned horizontally oriented one above the other, respectively with the largest and smallest circumference of the relevant sections of the tower sections above the other at the ends, whereby the deck area of a transport vessel is optimally utilized.

To be able to utilize the fixture according to the invention for transport of turbine towers as indicated in the previous section, a further console might be located upon the second frame part according, and with first and second holding devices.

To be able to easily fasten the fixture to another construction than the end of one or more members arranged in the fixture, such as a deck on a ship, a loading surface on a truck or a solid surface, the first connection devices for releaseably securing the fixture to an external structure different from the end of the member are formed of a number of lashing eyes on the side of the console facing away from the member.

It will then be easy to attach fixtures to a substrate, such as using lashing material suitable to cooperate with the lashing eyes on the console; however, it will be a prerequisite that there are corresponding attachment facilities for a secure anchoring of the lashing material on a relevant ship's deck, loading surface on a truck or a solid surface. Alternatively, it may be that the fixtures are welded, for example, to a ship's deck, a loading surface on a truck or a truck body.

To ensure an efficient retaining between the console and the column, the second connection devices for releaseable fastening of mainly horizontal emerging frame parts, may be composed of a clamping locking device, comprising a bolt with a mainly T-shaped head which, in use, is introduced and secured in a cooperating slit-shaped opening in a bottom plate in the columns, by a 90° turn of the bolt after introducing it through the slit-shaped opening in the bottom of a relevant column, and the free threaded end of said T-shaped bolt is introduced in a cooperating opening in rest plates for the horizontal frame parts, located closest to the boundary of the console, and where the threaded end includes a nut and a washer for clamping into firm attachment with the resting plates, with the T-shaped head in firm attachment against the bottom plates of the columns.

Hereby, is achieved a stable and restraint connection between the columns and the console, which helps to stabilize the fixture and accordingly ensures members arranged in it against dynamic jerk actions obtained from non firm connections between the columns and the console, as it is known by using the traditional twist-lock mechanisms for connecting between the console and the columns.

To make correct placement of the T-shaped bolt easier, the threaded end of the bolt with the T-shaped head may comprise a through-hole for introducing therein of a pivotally mounted control stick/grip for insertion of the T-shaped head in the slit-shaped opening in a bottom plate in a relevant column, and subsequent rotation of the T-shaped head to a cross-directed position relative to the orientation of the slit-shaped opening.

Hereby, is a correct placement of the T-shaped head of the bolt eased significantly as well as the control stick/grip provides for retaining of the T-shaped head until the nut is clamped sufficient so that the T-shaped head will not pivot in the slit-shaped opening.

For further ensure the retaining of the head of the T-shaped bolt, when it is turned in cross position relative to the slit-shaped opening, a line shaped protrusion may be provided on each side of the body of the bolt. Thus, an initiated clamping of the nut and following washer on the resting plates will result in that the line shaped protrusion on the T-shaped bolt head will be pressed against the bottom plate in a relevant column, whereby unintended turning of the T-shaped head during clamping of the nut will be counteracted.

Thus by the invention there is provided a fixture for use by transport of said members, which is swifter and easier in use than the known fixtures.

In the following, the invention is explained in more detail with reference to the accompanying drawings.

BRIEF DESCRIPTION OF THE DRAWINGS

FIG. 11 is an end view of a frame part intended for releaseable attachment to a console belonging to the fixture according to the invention, FIG. 12 is a detail view of a lower end of a column with a mounted attachment element according to the invention, FIG. 13 is a side view of what is shown in FIG. 11, FIG. 14 is a detail view of the upper end of the frame part shown in FIG. 11, FIG. 15 is a detail view of the third holding means on a frame part, of the fixture according to the invention, FIG. 16 is a perspective view of the frame shown in FIG. 11

FIG. 20 is a perspective view of second connection devices for releaseable attachment of mainly horizontal oriented frame parts emerging from the fixture, FIG. 21 is a side view of what is shown in FIG. 20, FIG. 22 is a side view of what is shown in FIG. 21, turned 90°

FIG. 23 is an end view of what is shown in FIG. 20,

FIG. 24 is a cross-section along the line I-I in FIG. 22,

FIG. 25 is a perspective view of angle shaped holding blocks which forms a part of the second holding means belonging to the fixture according to the invention, FIG. 26 is a side view of what is shown in FIG. 25, and FIGS. 27 and 28 are end views of what is shown in FIG. 25.

DETAILED DESCRIPTION OF THE INVENTION

Figure 1:
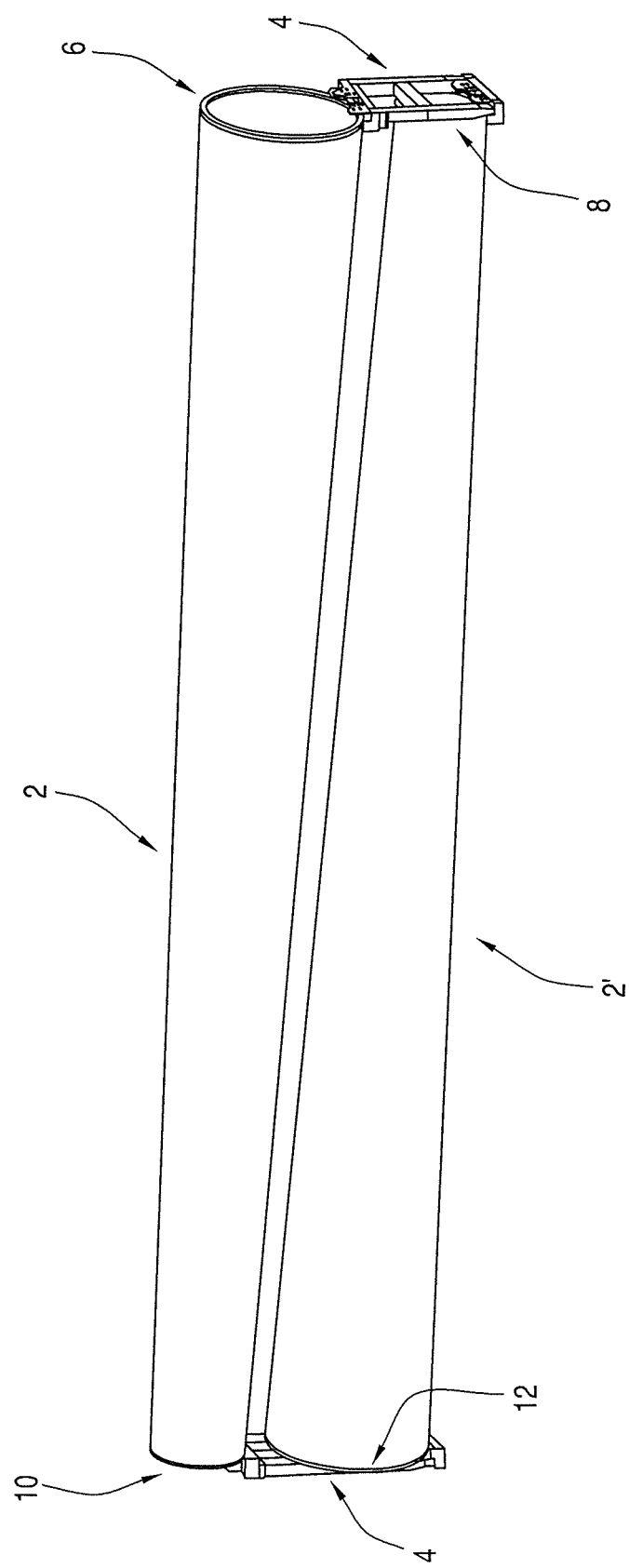
FIG. 1 is a perspective view of two wind turbine tower sections arranged above each other in a fixture according to the invention.

FIG. 1 shows a perspective view of a first and a second wind turbine tower section 2, 2' arranged one above the other in fixtures 4 according to the invention. As it can be seen, the tower sections have a conical shape, and are arranged so that the end 6 with the largest diameter of one section is arranged above the end 8 with the minor diameter of the other section 2', and the end 10 with the minor diameter of the first section 2 is arranged above the end 12 with the largest diameter of the other section 2'.

In the following, there is for the sake of clarity used the denotation "tower section" for members suited to be secured by using the fixture according to the invention. However, the members may as well comprise a wing for wind turbine mill, or a hub for a wind turbine mill so that the term tower section should be construed as encompassing such members as well.

Figure 2:
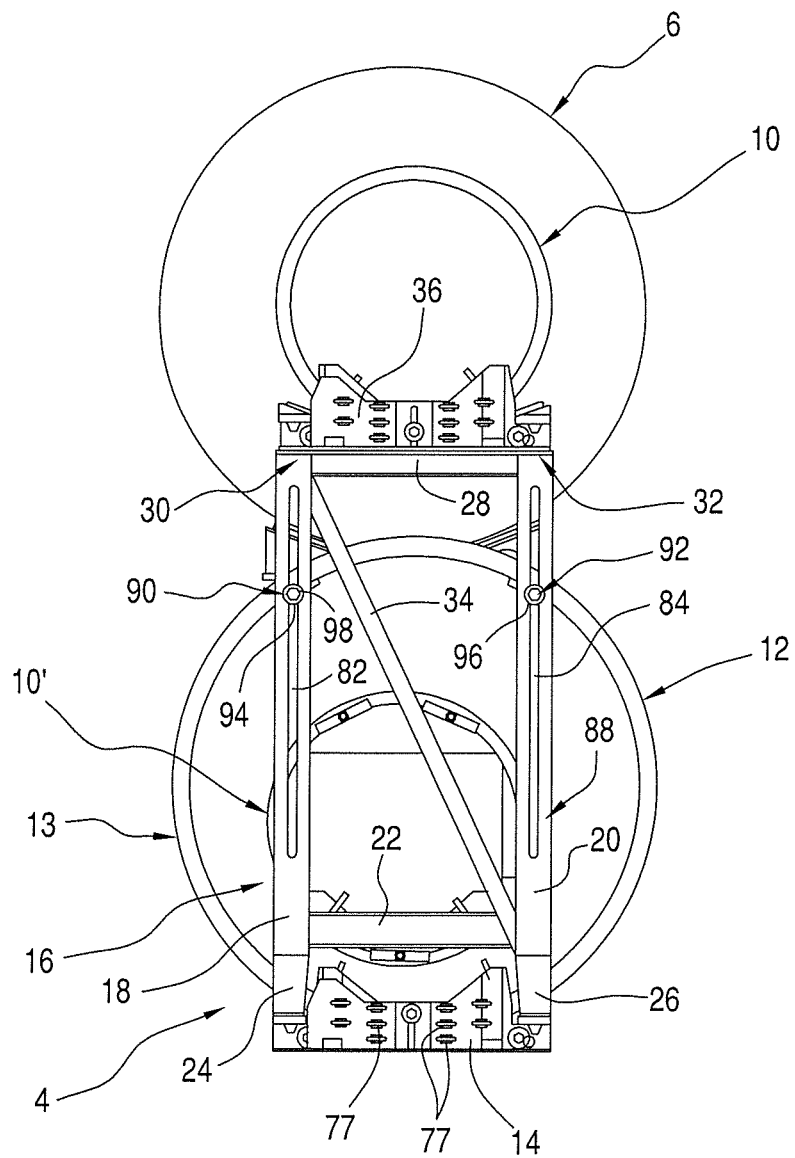
FIG. 2 is an end view of FIG. 1.

FIG. 2 is view by the ends 10, 10' of the tower sections 2, 2', of a first embodiment of a fixture 4 according to the invention, cf. FIG. 1.

The fixture 4 in the illustrated embodiment comprises a first lower console 14, and extends upward from the first lower console 14 is a further frame part 16 that comprises a first column 18 and a second column 20 which, in the illustrated embodiment, are interconnected by a first transverse strut 22 near the foot ends 24, 26 of the columns, and a second transverse strut 28 at the top 30, 32 of the columns 18, 20. The columns are further interconnected by a transverse strut 34 extending between the first and the second transverse struts 22, 28. The fixture further comprises an upper console 36, arranged upon the second transverse strut 28. The ends 10, 6, 12 of the tower sections 2, 2' are indicated in FIG. 2.

Figure 3:
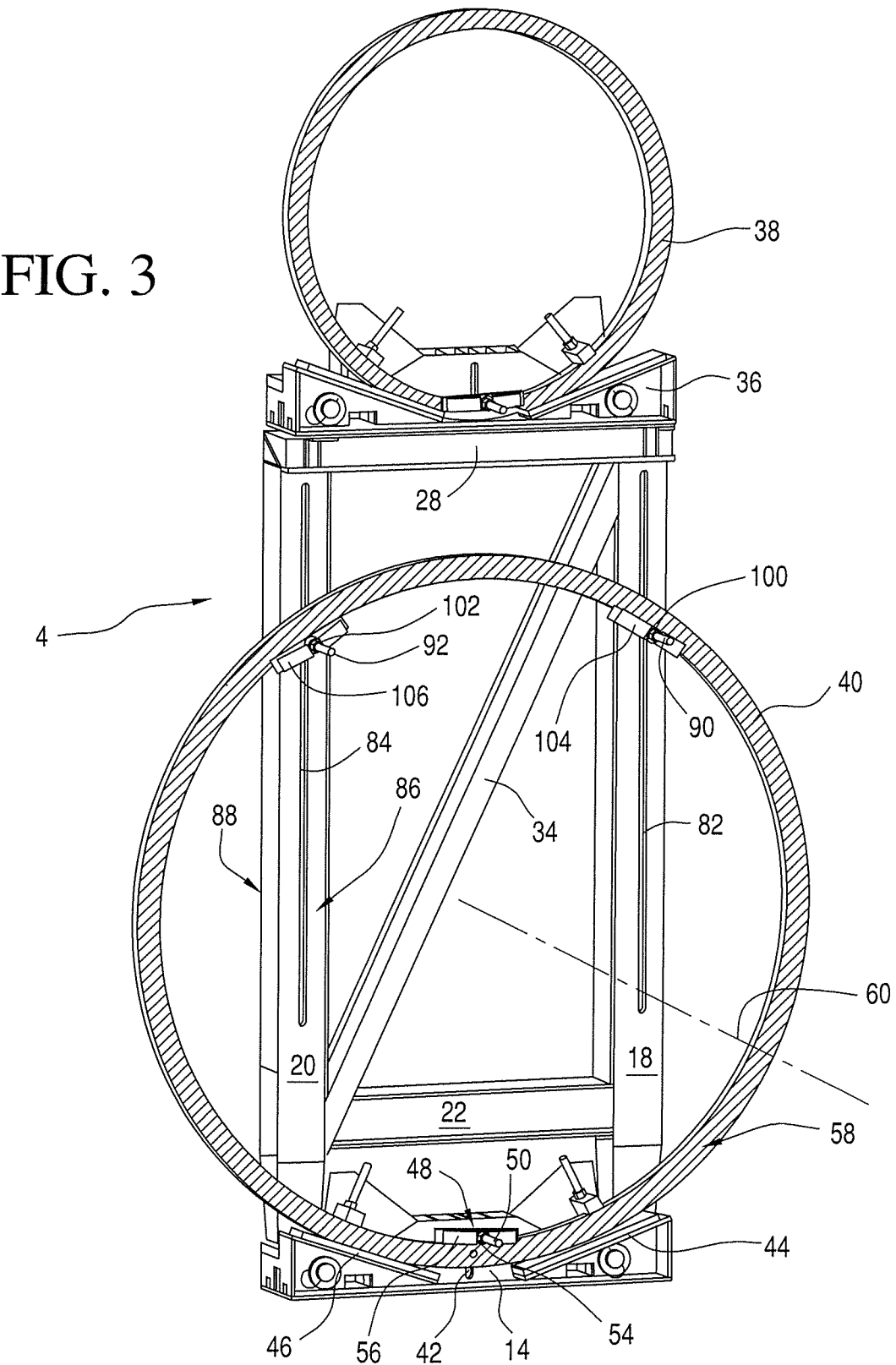
FIG. 3 is an enlarged end view of FIG. 1, seen from the inside of the flanges in the end of the tower sections, but where the conical shaped tubes are hidden.

In FIG. 3, the fixture 4, shown in FIG. 2, is depicted in an enlarged version, seen from the "tower-side", but where the tower walls are hidden for the sake of illustration. However, the flanges 38, 40 respectively in the ends 10, 12 of the tower sections 2, 2' are shown.

As it further appears from FIG. 3, the console 14 comprises a through-slit-shaped opening 42 located between cross positioning means 44, 46, for passing through of a displaceable mounted first holding device 48 in the form of a bolt 50 or a threaded rod with a nut, the free threaded ends of said bolt or threaded rod being provided with a washer 52 and a nut 54 for clamping of a displaceable mounted first wing shaped holding device 56 on the bolt or threaded rod, for engagement of the side 58 opposite the current console 14 of the flange 40 in the end of the tower section 2', for counteracting of relative displacements between the console 14 and the tower section 2' oriented in the towers length axis 60.

Figure 4:
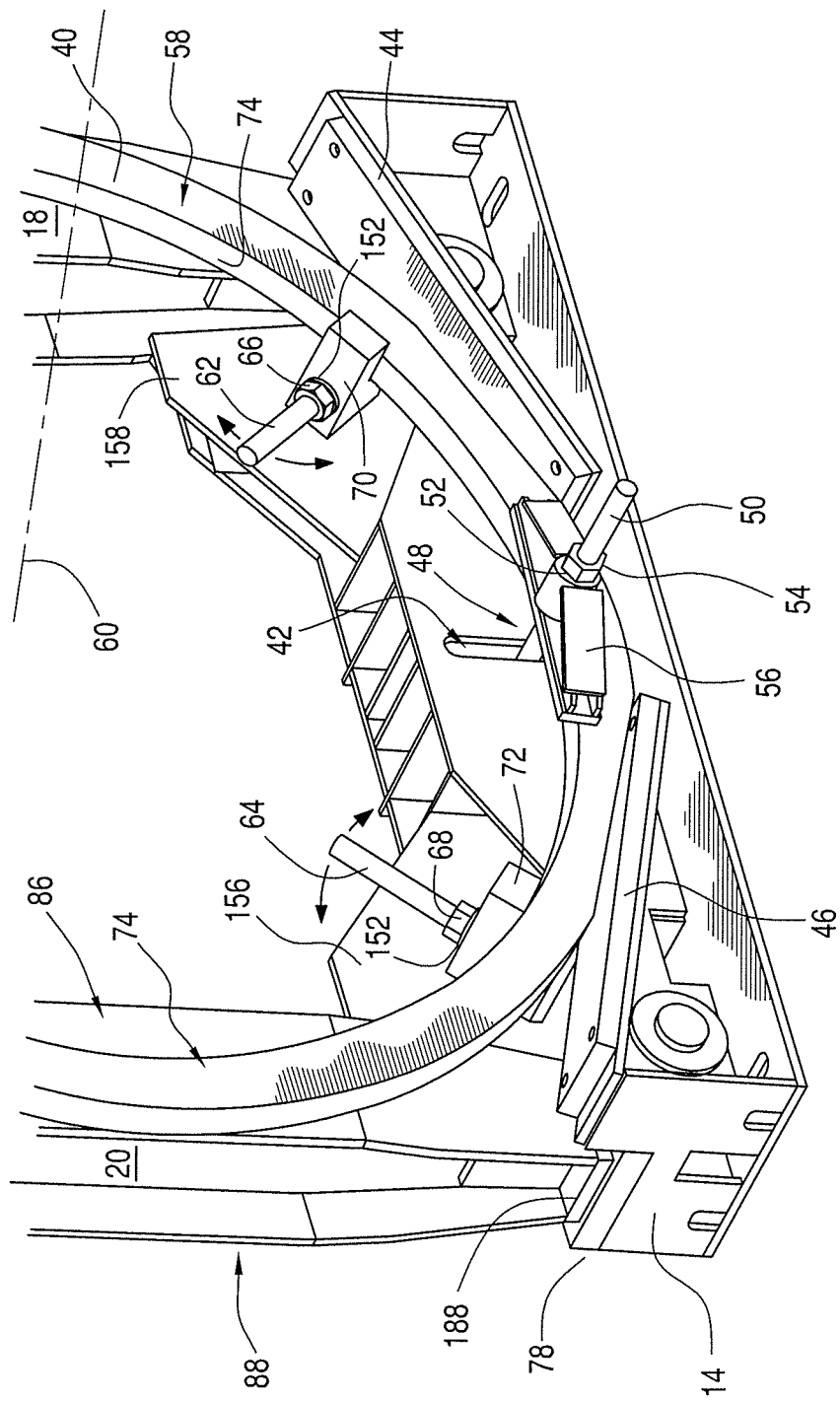
FIG. 4 is a detail view of a console belonging to the fixture seen from same position as in FIG. 3.

As it further appears from FIG. 3, but more clear from FIG. 4, the console 14 comprises two in the console pivotably mounted, threaded rods or bolts 62, 64, the free ends of which comprises nuts 66, 68 for clamping of displaceable second holding devices 70, 72 on said rods, for engagement of the against the length axis facing side 74 of said flange on the end of the tower section 2', for counteracting of a relative horizontal oriented displacement between the tower section 2' and the console 14 in a cross direction of the length axis 60 of the tower section 2' in use.

Figure 5:
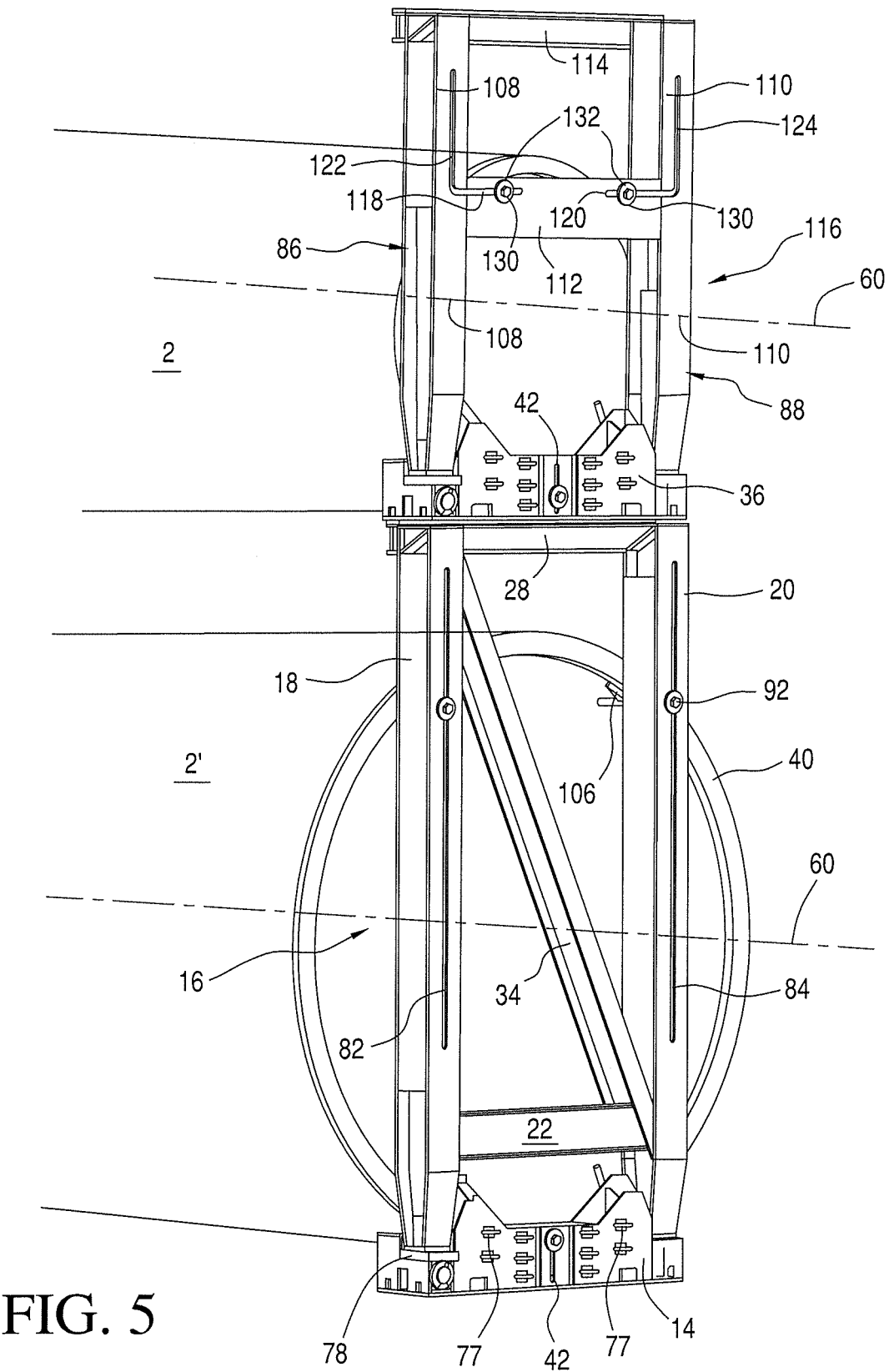
FIG. 5 is a perspective illustration of the depict in FIG. 2, but where the upper console is provided with upstanding columns an cross beams for further stabilizing of the upper located tower section against transverse directed forces.

As it appears from FIGS. 2 & 5, f.f., the console 14 also comprises a first connection means in the form of D-shaped rings 77 for releaseably securing the fixture (the console 14) to an external structure different from the end of the tower section 2', for example, a ship's deck (not shown) by a lashing material (not shown).

The console 14 also includes parts in the form of rest plates 78 which cooperate with second connection devices 80, c.f., FIGS. 8, 11, 13, 14, & 16, for releaseable attachment of first vertically upstanding frame parts 16, as described earlier.

As it further appears from the embodiment of the fixture shown in FIGS. 2-4, the fixture 4 comprises a frame part 16 extending upward from the rest plates 78 which comprises two parallel columns 18, 20, which, in the illustrated embodiment, are interconnected by a first transverse strut 22 near the foot ends 24, 26 of the columns and a second transverse strut 28 at the top 30, 32 of the columns 18, 20. The columns in the illustrated embodiment are further interconnected by a sloping transverse strut 34 extending diagonally between the first and the second transverse strut 22, 28. The fixture also includes an upper console 36 arranged upon the second transverse strut 28. FIG. 2 shows the ends 6, 10, 12 of the tower sections 2, 2' shown in FIG. 1. The upper console 36 is equipped with first and second holding means (corresponding first holding means 48 and second holding means 70, 72) and is constructed in the same way as the console 14 so that a further description of the console 36 is omitted here.

Each of the columns 18, 20 has aligned, parallel through-slit-openings 82, 84 on the side 86 adjacent to the end of the tower sections 2, 2' and at least one displaceable threaded rod/bolt 90, 92 is inserted through said slit-openings from the oppositely facing side 88. The first end of the threaded rod/bolt 90, 92 has a head 94, the diameter of which is larger than the width of the slit-shaped openings 82, 84. Mounted on threaded rod/bolt between the head 94 and the facing surface of the columns 18, 20 is a powerful washer 96, 98 to disperse the traction force on the adjacent surface 88 of the columns 18, 20.

A cooperating nut 100, 102 for clamping of a displaceable mounted third wing shaped holding means 104, 106, the design of which corresponds with the first wing shaped holding means 56, for engagement of the side 58 facing away from the second frame part 16 of the flange 40 in the end of the member 2' is mounted on the other end of the threaded rods/bolts 90, 92. The holding means 104, 106, serve for counteracting of a relative horizontally oriented displacement between the member 2' and the fixture 4 in a transverse direction relative to the length axis 60 of the member.

Figure 6:
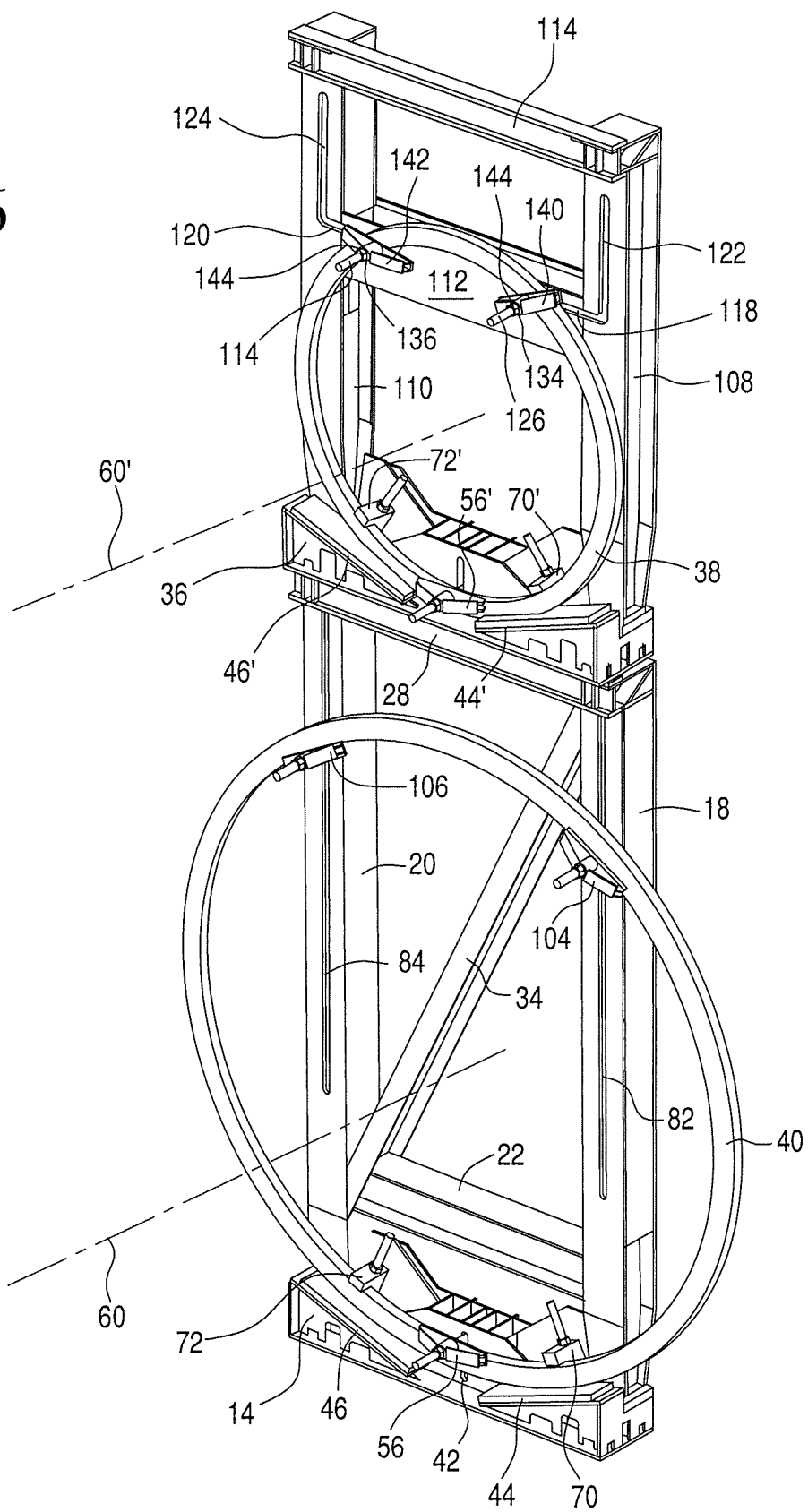
FIG. 6 shows the same as FIG. 5, but seen from the inside of the tower side, and where the tubes of the tower sections are hidden.

FIGS. 5 & 6 show a perspective view obliquely from behind of a further embodiment of the fixture 4. The fixture 4 is basically designed as shown in FIGS. 2-4 and as described above. However, the embodiment shown in FIG. 5 comprises a second frame part 116 which extends upward from a second set rest plates on the upper console 36 which correspond to the rest plates 78 on the lower console. The second frame part 116 is secured to the upper console 36 in the same way as the first frame part 16 is secured to the lower console 14.

The second upstanding frame part 116 includes, similar to the first upstanding frame part 14, two columns 108, 110, which are interconnected by a first transverse strut 112 and a second transverse strut 114. However, the second upstanding frame part 116 differs in that the transverse strut 112 includes aligned parallel, transversely oriented, through-slit-openings 118, 120 connect with the through-slit-openings 122, 124 in the columns 108, 110.

At least one threaded rod/bolt 126, 128 is displaceably mounted in the transversely oriented slit-openings 118, 120, the threaded rod/bolt having a head 130, the diameter of which is larger than the breath of the slit-openings 118, 120, 122, 124, and which, during use of the fixture, acts via heavy washers 132 on the facing side 88 of the columns of the tower section 2, and the second threaded end of which carries cooperating nuts 134, 136, for clamping displaceably mounted, third wing shaped holding means 140, 142 126, 128 on said rods. The shape of third wing shaped holding means 140, 142 126, 128 corresponds with the design of the first wing shaped holding means 56. A heavy washer 144 is arranged between the nuts 134, 136 and the wing shaped holding means 140, 142. The third wing shaped holding means 140, 142 is, as shown in FIG. 6, and is for engagement with a flange 38 on the end of the tower section 2 and the fixture 4 in a direction of the length axis 60' of the tower section.

The transverse oriented slit-openings 118, 120 serve to compensate for larger deviations between the diameters of the tower sections at the ends.

The second holding devices 70, 72 are for engagement with a flange 40 on the end of the member and are formed of claws which, in the illustrated embodiment, are designed as angle-shaped blocks, as shown in FIG. 25 and FIG. 26.

The first leg 146 of the angular shaped blocks includes a through-hole 148 as shown in FIGS. 25 & 28 for receiving of the threaded rods/bolts 62, 64, pivotally mounted and anchored in the console 14, so that the angular shaped blocks 70, 72 are displaceably mounted on the threaded rods/bolts 62, 64. The second leg 150 of the angular shaped blocks 70, 72, as shown in FIGS. 25-27, protrudes perpendicularly from the first leg 148 which, during use, is brought in attachment with the member facing side 74 of the flange 40 in the end of the tower section, and is firmly clamped to the flange 40 by a nut 66, 68 on the end of the threaded rod/bolt. Between the nuts 66, 68 and the angular shaped blocks are arranged washers 152, as shown in FIG. 4, for ensuring a correct location of the blocks during clamping of the nuts 66, 68.

The angular shaped blocks 70, 72 have, as it appears from FIGS. 4, 25 &. 26, a flat surface on the side 154 facing away from the flange 40 which, during use of the fixture, is in engagement with upstanding support plates 156, 158. The support plates 156, 158 serve to stabilize engagement of the angular shaped blocks against the side 74 of the flange 40, so that an approximately perpendicular engagement on the side surface 74 is ensured so secure against the relative high momentum, and the dynamic effects that an actual tower section 2, 2', arranged in the fixture, is exposed to during transport, for example, as deck load during sea transport.

Figure 17:
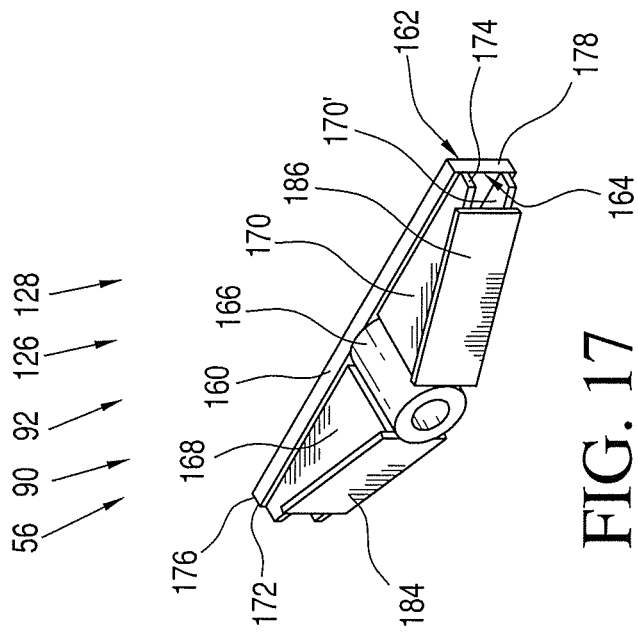
FIG. 17 is a detail perspective view of the first and third holding means belonging to the fixture, shown in FIG. 3, FIG. 4 and in FIG. 13, FIG. 15 and FIG. 16, according to the invention.
Figure 18:
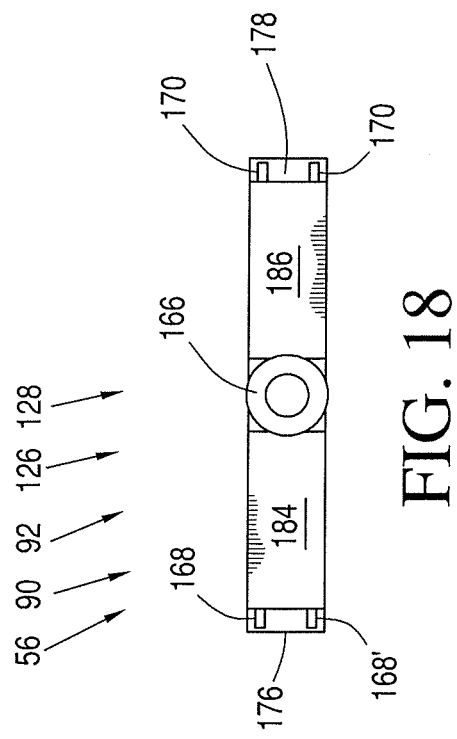
FIG. 18 is a top view of what is shown in FIG. 17.
Figure 19:
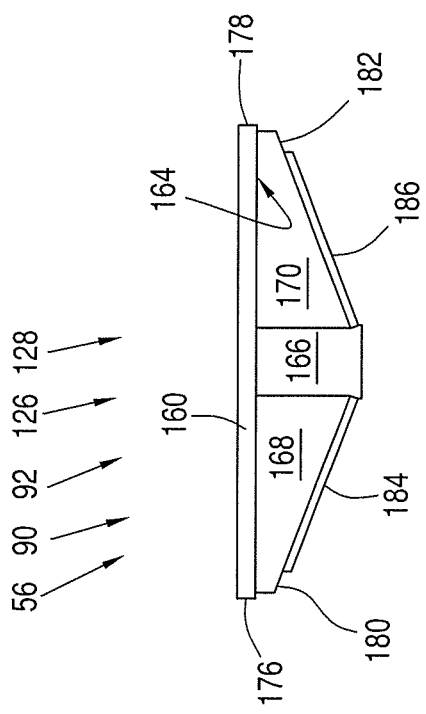
FIG. 19 is a side view of what is shown in FIG. 17.

FIGS. 13 & 15 and especially in FIGS. 17-19 shown the first and third wing shaped holding devices 56, 104, 106, 140, 142, which, in the illustrated embodiment, are formed of a wing having a plane pressure plate 160 with a first surface 162 for engagement against a flange 40 in the end of a tower section, and a second surface 164 having a bush 166 that extends upward from the middle of the surface for receiving a bolt or a threaded rod 50, 90, 92, 126, 128. From said upstanding bush 166 and from the second surface 164 extend similar wedge shaped fish plates 168, 170, the height of which above the second surface 164 decreases in a direction away from the bush 166 toward edges 172, 174, where it ends at the edges 176, 178 of the pressure plate 160.

The side edges 180, 182 of the fish plates facing away from the second side surface 164 are connected to a plate 184, 186 that extends from the bush towards the end 172, 174 of the fish plates 168, 170, as it appears from FIGS. 17-19.

By the first and third wing shaped holding means 56, 104, 106, 140, 142, in combination with longitudinal and transverse tracks in columns 18, 20, 108, 110 and the transverse struts 112, and the second holding devices 72, 74 pivotally mounted in the console 4, there is thus obtained a fixture 4 which, in use for transport of members such as tower sections 2, 2', etc., is completely independent of hole patterns in adjacent flanges, and which also allows securing of practically all known dimensions of flanges, and which also allows a quick mounting and attachment of relevant members.

Figure 7:
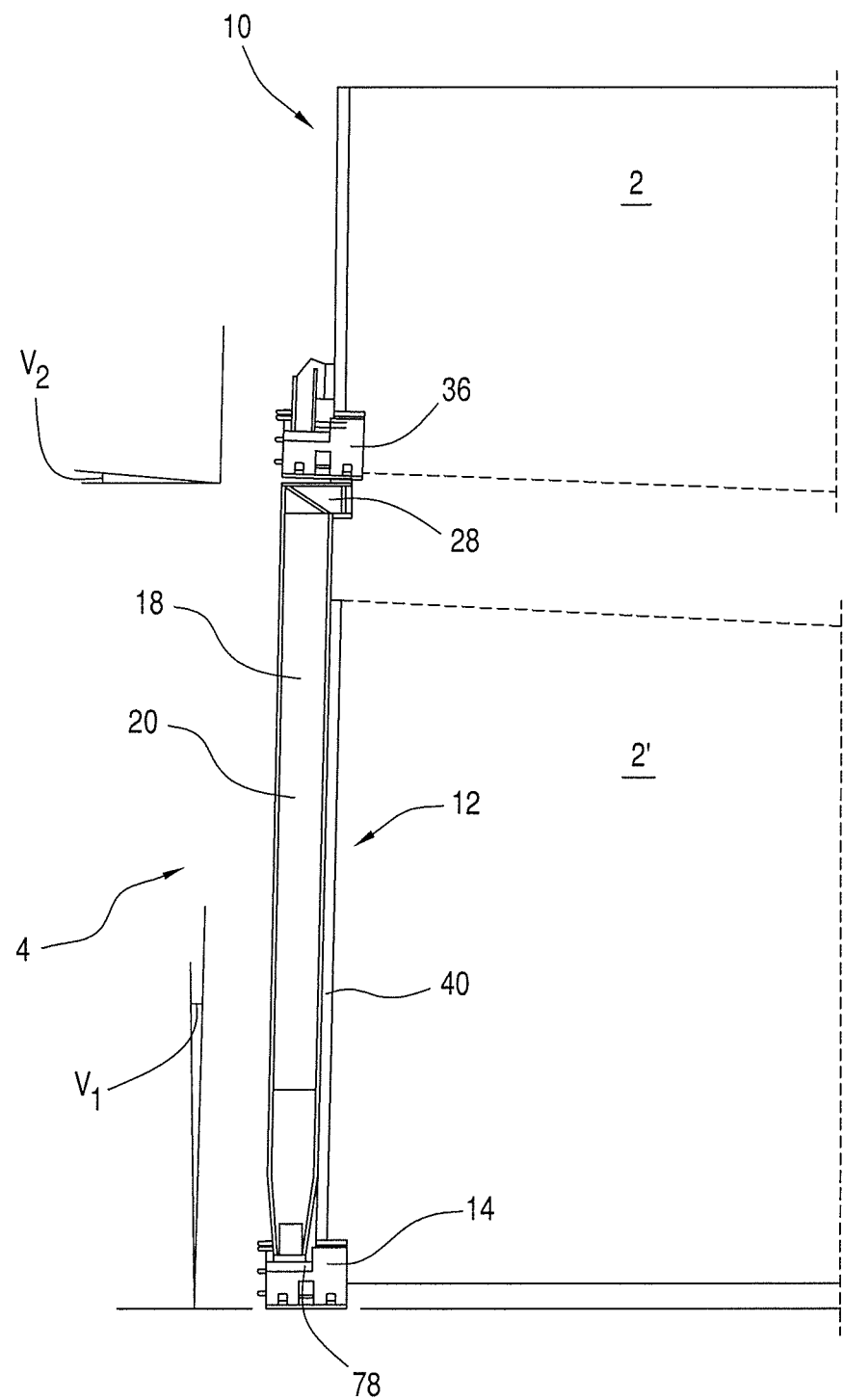
FIG. 7 is a side view of the in FIG. 2 shown.
Figure 8:
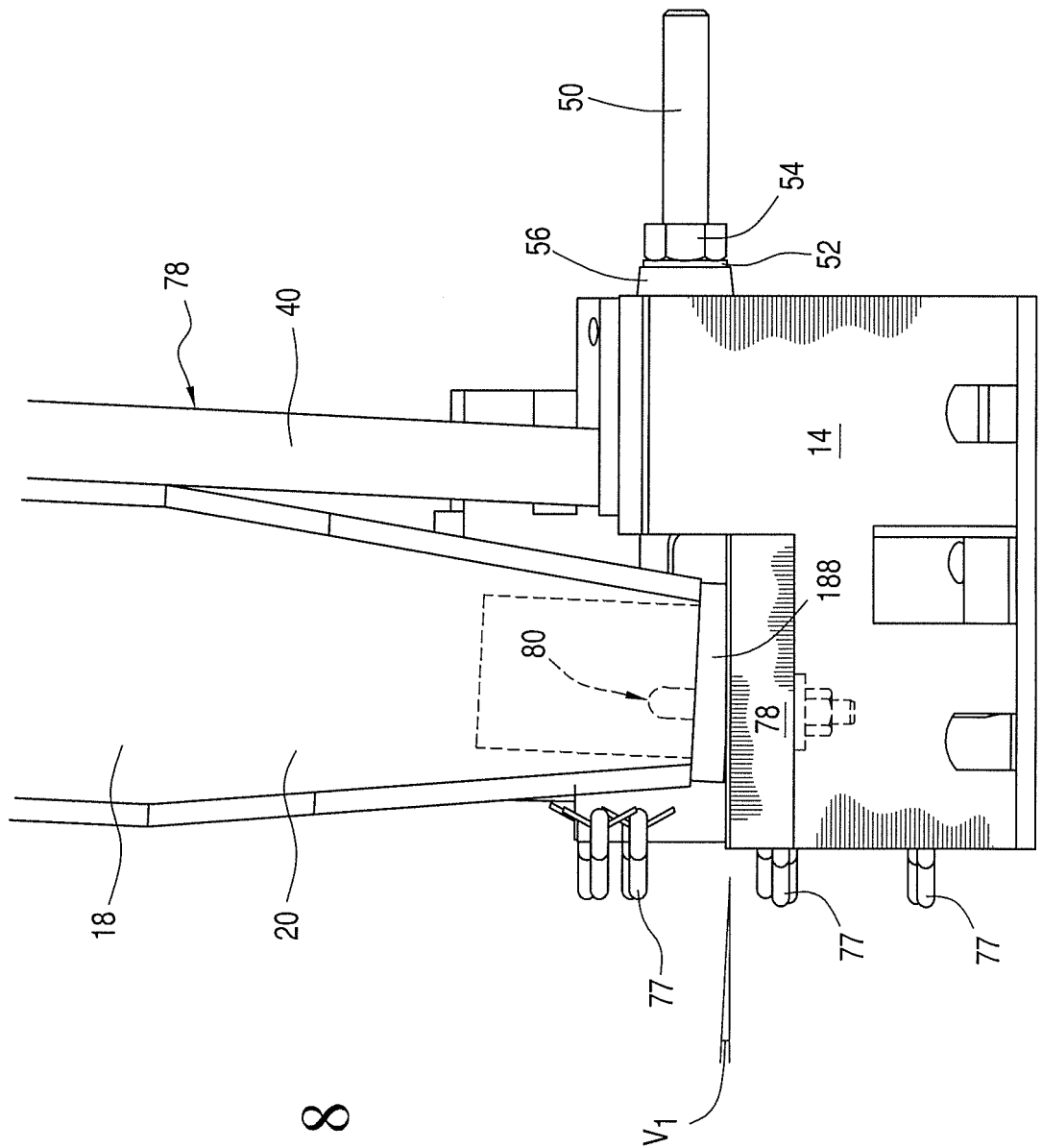
FIG. 8 is a detail-side view of the transition between a console and a column belonging to the fixture according to the invention.

As it appears from FIG. 7, and more clearly in FIG. 8 showing respectively a side view of the fixture 4 shown in FIGS. 1-3 and a detail view of the first lower console 14 with the rest plates 78 and the bottom plate 188 on the lower end 24, 26 of the columns 18, 20, the flange 40 is clamped firmly against the columns 18, 20, by clamping of the third wing shaped holding means 104, 106 (c.f., FIG. 6). As a result of the conical shape of the tower section, the frame part 16 extends from the console in an angle $V_1$ relative to vertical. Similarly, it appears from FIG. 7 that the upper console 36 by clamping of the first holding means forms an angle $V_2$ with the transverse strut 28 and by the third holding devices is clamped firmly to the end of the member. The advantages of this are several, but the most important is that the holding means are not loaded so hard dynamically during transport, thanks to the short distance between the anchoring point in the columns and the holding means. This results in, together with the provided friction between the flange 40 and the columns 18, 20 generated by clamping of the nuts 100, 102, a considerable increased stability during transport of members/tower sections 2, 2', secured in the fixture 4.

FIGS. 11 & 12 show an embodiment in which the second connection device 80, for releaseable attachment to the console 14, 36 (c.f., FIG. 5), the upstanding vertically oriented frame parts 16, 116 are mounted to the bottom plate 188 (c.f., FIG. 4), and in FIGS. 13 & 14, the connection device 80 is mounted on a transverse beam 114 on the upper frame part 116.

Figure 9:
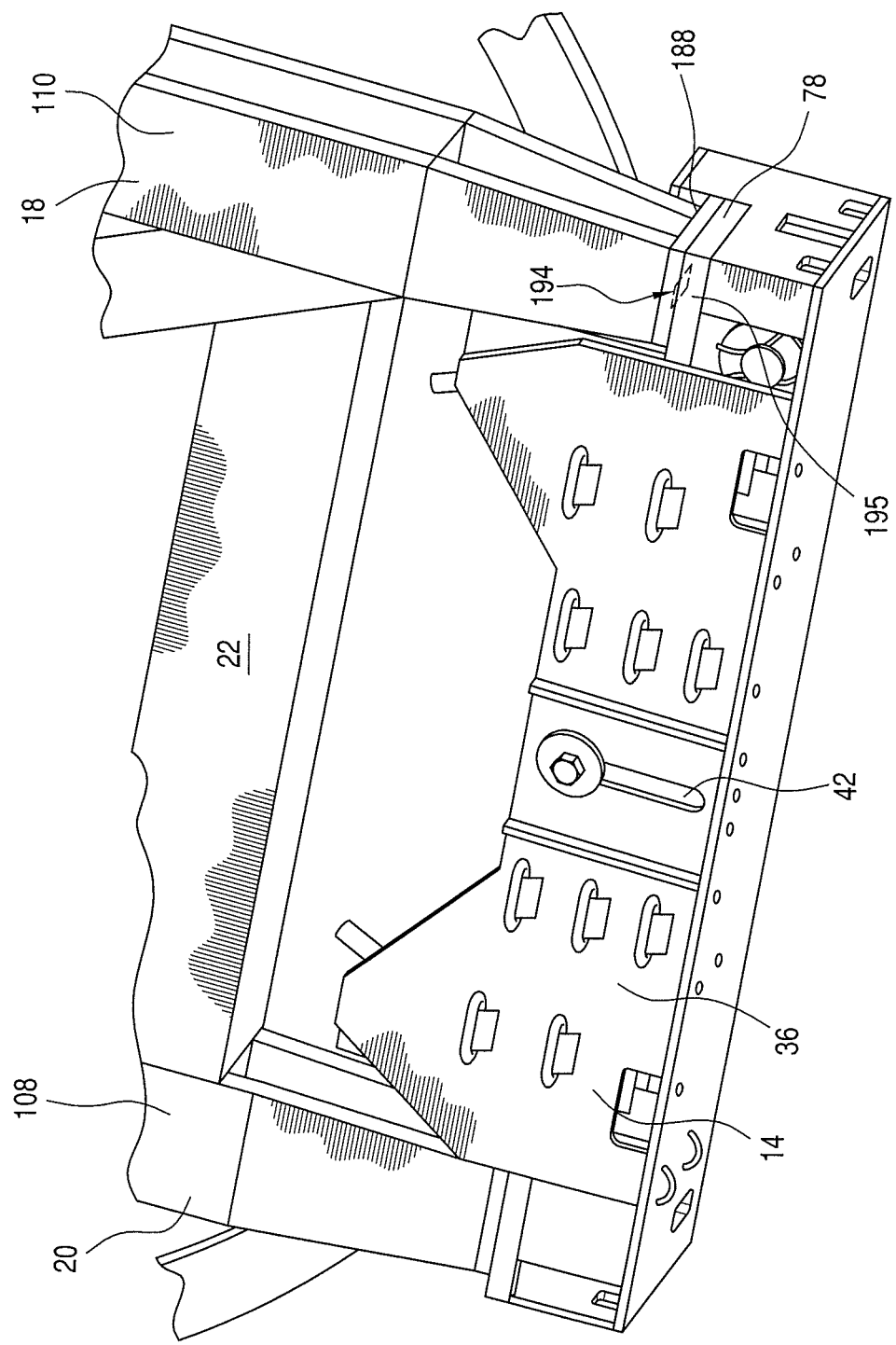
FIG. 9 is a perspective illustration of the console shown in FIG. 8, where parts of the lower end of the column are made transparent.
Figure 10:
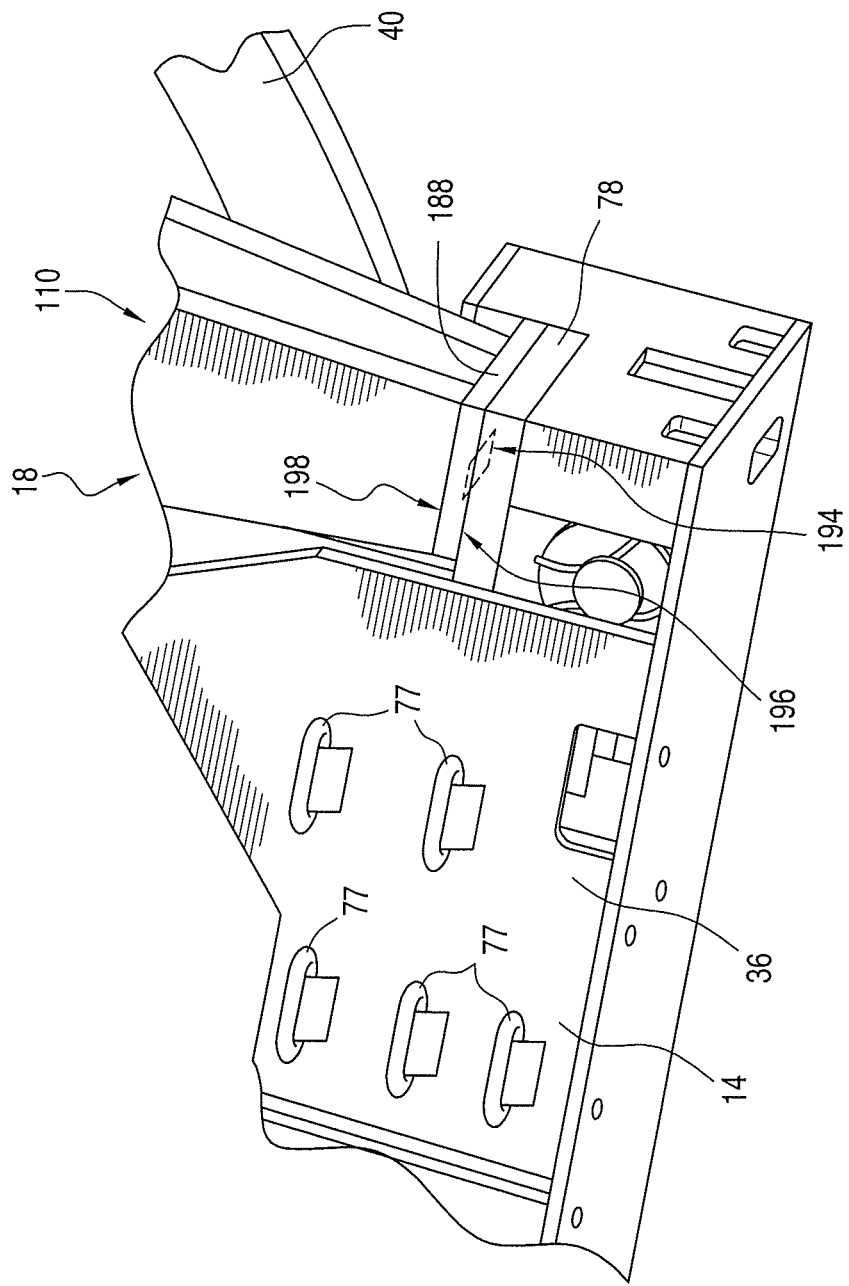
FIG. 10 is a detail-perspective view of the console shown in FIG. 9.

The connection device 80 includes a clamping locking mechanism comprising a bolt 190 with a mainly T-shaped head 192 as shown in FIGS. 20 & 21. In use the T-shaped head 192 is introduced and secured in a cooperating slit-shaped opening 194 in the bottom plate 78 in a respective column 18, 20, 108, 110 shown in FIGS. 9 & 10. After introducing of the T-shaped bolt head 192 through the slit-shaped opening 194, the bolt is turned 90°, whereby the head 192 is brought in engagement with the opposed surface 198 of the bottom plate 78 relative to the plug in side 196 for the bolt.

The end opposite the T-shaped head of bolt 190 is a free threaded end 200 designed to be introduced into cooperating openings 201 in the rest plates 78 at the edges of the console 14, 36. After insertion of the threaded end in a respective hole in a relevant rest plate 78, a washer 204 and nut 202 are placed on the threaded end 200 of the bolt, after which the nut 202 is tightened to a preferred torque.

The threaded end 200 of the bolt 190 with the T-shaped head 192 has a through-hole 206 as shown in FIGS. 20-24, for introducing therein of a pivotally mounted and axially displaceable control stick/grip 208, c.f., FIGS. 11-13 for insertion of the T-shaped head 192 in the slit-shaped opening 194 in a bottom plate 78 in a relevant column, and subsequent rotation of the T-shaped head 192 to a cross-directed position relative to the orientation of the slit-shaped opening. The control stick 208 has a blunt protruding end 210, c.f., FIGS. 11-14, which is bent at an angle relative to the portion of the control stick 208 which is pivotally mounted in the bolt 190. The control stick 208 may, as shown in FIG. 14, be retained in a slit-shaped opening in the transverse strut 114, whereby the position of T-shaped head with a transverse orientation relative to the slit-shaped opening 194 in the bottom plate 188 of the column is maintained also during tightening the nut 202.

As it further appears from FIG. 20 and most clearly in FIG. 20, the attachment surface 214, facing the bottom plate 78 of the head 192 of T-shaped bolt, has a line shaped protrusion 216 on each side of the body 218 of the bolt.

The fixture of the invention may be realized in other embodiments than those described above. For example, the fixture could be operated with an alternative design of the first and third securing means without changing the concept of the invention which is to provide a fixture for retaining of a member, such as a section of a wind turbine tower, a wing for a wind turbine or a hub for a wind turbine, which is easy to mount and use, and which is also independent of the hole patterns for relevant flanges in the end of the members which are attached to the fixture.

What is claimed is:

1. Fixture for retaining of an end of at least one wind turbine component from the group consisting of wind turbine blades, wind turbine hubs, and wind turbine tower sections, during transport, said fixture comprising:
   an axial control/retaining mechanism in the form of a first lower console for counteracting of a relative horizontal displacement between the end of the at least one wind turbine component and the fixture in a direction perpendicular to a longitudinal axis of the end of the member in use, said console includes cross-positioning means for positioning the end of the at least one wind turbine component in relation to the fixture during fastening of the fixture to the end of the at least one wind turbine component relative to a horizontal oriented direction parallel to the end of the at least one wind turbine component in use, and cross-axial holding means for counteracting of a relative displacement between the end of the at least one wind turbine component and the fixture in a transverse direction of the longitudinal axis of the at least one wind turbine component,
   first connection devices for attachment of the fixture to an external structure other than the end of the at least one wind turbine component and parts cooperating with at least two second connection devices for releaseable attachment of essentially vertically oriented frame parts of the fixture,
   wherein the console comprises a through-slit-opening located between the cross positioning means receiving a displaceable first holding device in the form of a bolt or a threaded rod with an end nut, a free end of said bolt or threaded rod being provided with a clamping nut for clamping the displaceable first holding device on said bolt or threaded rod for engagement of an oppositely facing side of a flange of the end of the at least one wind turbine component for counteracting of relative displacements between the console and the at least one wind turbine component parallel to the longitudinal axis of the at least one wind turbine component during use, and
   at least two pivotally mounted, threaded rods or bolts, free ends of which have nuts for clamping a displaceably mounted, second holding device on said rods or bolts, said second holding device forming said cross-axial holding means and comprising claw-shaped angular blocks for engagement against a length axis oriented side of said flange, for counteracting of horizontally directed displacement between the at least one wind turbine component and the fixture in a transverse direction relative to the longitudinal axis of the member during use,
   wherein the vertically oriented frame parts of the fixture comprise a first upstanding frame part cooperating with the second connection devices that is formed of two parallel columns and at least one transverse beam connecting the columns that is of a length which at least corresponds with a diameter of a respective end the at least one wind turbine component, said columns each having a through-slit-opening on a side adjacent to the end of the at least one wind turbine component, the through-slit-openings being aligned parallel to each other, and at least one displaceable threaded rod/bolt mounted in said through-slit-openings, a first end of which includes a head the diameter of which is larger than the width of the slit-shaped openings, said head engaging the respective column during use of the fixture and a second end of which is a threaded end having a nut clamping a displaceably mounted third holding device in engagement with a flange on the end of the at least one wind turbine component relative to a second frame part for counteracting of relative horizontal oriented displacement between the at least one wind turbine component and the fixture in a transverse direction relative to the longitudinal axis of the member during use.

2. Fixture according to claim 1, further comprising a second transverse beam, wherein the second transverse beam has aligned, parallel through-slit-openings which are transversely oriented relative to and connected with the slit-openings in the columns, at least one displaceable threaded rod/bolt being mounted in said slit-openings of the second transverse beam, a first end of which includes a head the diameter of which is larger than the width of the slit-shaped openings, and a second threaded end of which has a nut for clamping the displaceably mounted third holding device on said rods/bolts for engagement with the flange on the end of the at least one wind turbine component for counteracting of horizontally oriented displacement between the at least one wind turbine component and the fixture in a direction parallel to the longitudinal axis of the at least one wind turbine component in use.

3. Fixture according to claim 1, wherein the first and third holding devices comprise a wing having a planar pressure plate with a first surface for engagement with the flange of the end of the at least one wind turbine component and a second surface from the middle of which a bushing for receiving a bolt or a threaded rod projects, and from an upstanding bushing and from the second surface, extend equally formed, wedge-shaped, plate-shaped lugs/props, the height of which from the second surface is lowest at an end thereof facing away from the bushing at a respective edge of the pressure plate, and wherein edges of said lugs/props facing away from the second side surface being connected with a plate extending from the bushing in a direction toward the respective edge of the pressure plate.

4. Fixture according to claim 1, wherein the second frame part cooperates with the second connection devices which are adapted to be clamped, in use, to the end of the wind turbine component, by additional, third wing shaped holding devices.

5. Fixture according to claim 1, further comprising, for holding a second wind turbine component, a second said console mounted upon the first frame part, with a second set of first and second holding devices and a second said upstanding frame part extending upward from the second console.

6. Fixture according to claim 1, wherein the second connection device comprises a clamping locking device having a T-shaped bolt with an essentially T-shaped head which, in use, is introduced and secured in a cooperating slit-shaped opening in a bottom plate of the columns by a 90° turn of the bolt after introducing it through the slit-shaped opening in the bottom of the respective column, and wherein a free, threaded end of said T-shaped bolt is located in a cooperating opening in resting plates for the frame parts, and wherein the threaded end carries a respective nut and washer for clamping of the bottom plates of the columns into firm attachment with the resting plates, the T-shaped head being in firm engagement against the bottom plates of the columns.

7. Fixture according to claim 6, wherein the threaded end of the T-shaped bolt comprises a through-hole for introducing therein a pivotally mounted control stick/grip for insertion of the T-shaped head in the slit-shaped opening in a bottom plate of a respective column and for subsequent rotation of the T-shaped head to a transversely-directed position relative to the orientation of the slit-shaped opening.

8. Fixture according to claim 6, wherein a line shaped protrusion is provided on each side of the bolt extending from an abutting surface of the head of the T-shaped bolt.

* * * * *